United States Patent
Yoshinari et al.

(10) Patent No.: US 7,538,947 B2
(45) Date of Patent: May 26, 2009

(54) ANTIGLARE LIGHT DIFFUSING MEMBER

(75) Inventors: Tomo Yoshinari, Tokyo (JP); Kae Takahashi, Tokyo (JP)

(73) Assignee: Toppan Printing Co., Ltd. (JP)

( * ) Notice: Subject to any disclaimer, the term of this patent is extended or adjusted under 35 U.S.C. 154(b) by 0 days.

(21) Appl. No.: 11/818,396

(22) Filed: Jun. 13, 2007

(65) Prior Publication Data

US 2008/0137204 A1   Jun. 12, 2008

(30) Foreign Application Priority Data

Dec. 6, 2006   (JP) .............................. 2006-329342

(51) Int. Cl.
*G02B 5/02* (2006.01)
*G02B 13/20* (2006.01)

(52) U.S. Cl. ...................................... 359/599

(58) Field of Classification Search ................. 359/599
See application file for complete search history.

(56) References Cited

U.S. PATENT DOCUMENTS 6,480,249 B2 * 11/2002 Iwata et al. .................. 349/112
2006/0153979 A1 * 7/2006 Asakura et al. ............. 427/164
2007/0253064 A1 * 11/2007 Ookubo et al. .............. 359/599

FOREIGN PATENT DOCUMENTS

| JP | 11-160505 | 6/1999 |
|----|-----------|--------|
| JP | 11-305010 | 11/1999 |
| JP | 11-326608 | 11/1999 |
| JP | 2000-180611 | 6/2000 |
| JP | 2000-338310 | 12/2000 |
| JP | 2003-004903 | 1/2003 |
| JP | 2003-149413 | 5/2003 |
| JP | 2003-260748 | 9/2003 |
| JP | 2004-004777 | 1/2004 |
| JP | 2004-082613 | 3/2004 |
| JP | 2004-125958 | 4/2004 |

* cited by examiner

*Primary Examiner*—Joshua L Pritchett
(74) *Attorney, Agent, or Firm*—Squire, Sanders & Dempsey L.L.P.

(57) ABSTRACT

An antiglare light diffusing member is disclosed comprising a transparent base material; and an antiglare light diffusing layer including a binder matrix and a particle; wherein, as for the layer, arithmetic average roughness Ra1 ($\lambda c$: 0.008 mm) on the basis of JIS-B0601-1994 is less than 0.008 μm, Ra2 ($\lambda c$: 0.8 mm) on the basis of JIS-B0601-1994 is 0.1-0.5 μm and an internal haze is 1-7%.

6 Claims, 4 Drawing Sheets

ANTIGLARE LIGHT DIFFUSING MEMBER

CROSS REFERENCE

This application claims priority to Japanese application number 2006-329342, filed on Dec. 6, 2006, which is incorporated by reference.

BACKGROUND OF THE INVENTION

1. Field of the Invention

The present invention relates to an antiglare light diffusing member to be provided on the surface of a window, display etc. In particular, it relates to an antiglare light diffusing member to be provided on the surface of such displays as a liquid crystal display (LCD), cathode-ray tube (CRT) display, plasma display (PDP), organic electroluminescence display (ELD) and field effect display (FED, SED).

2. Description of the Related Art

Displays such as a liquid crystal display, CRT display, EL display and plasma display have problems from the view point of visibility including:

External light reflects at looking and listening.

Surface glare (scintillation) occurs at the display surface by display light from the display.

Poor visibility caused by dazzle of display light directly coming from the display without being diffused, etc.

Visibility is also degraded by such defect as unevenness of brightness.

In order to solve such lowering or degradation of visibility, it is known to arrange an antiglare light diffusing member on the front face of a display.

As an antiglare light diffusing member, for example, following techniques are known:

To arrange, on the surface of a display, an antiglare light diffusing member having an antiglare light diffusing layer having been subjected to embossing finish.

To arrange, on the surface of a display, an antiglare light diffusing member having an antiglare light diffusing layer on the surface of which is formed irregularity by mixing particles in a binder matrix.

In such antiglare light diffusing member, scattering phenomenon (surface diffusion) of light caused by surface irregularity is utilized.

Further, such antiglare light diffusing member is also known that, by mixing particles having a refraction index different from that of a binder matrix into the binder matrix, utilizes internal scattering (internal diffusion) of light based on the difference in refraction indices of the binder matrix and particles.

In an antiglare light diffusing member on the surface of which is formed irregularity through embossing finish, the surface irregularity thereof can be completely controlled. Consequently, reproducibility is good. However, when there is a defect or an adhered foreign substance on an emboss roll, endless defects occurs at the pitch of roll. Consequently, in the case of mass production, all the products have defect. Further, since the scattering only at the surface is utilized, there are following problems.

Abrasion resistance

Lowering of contrast

Occurrence of dazzling

An antiglare light diffusing member using a binder matrix and particles can be manufactured through a smaller number of processes than the antiglare light diffusing member using embossing finish. Accordingly, it can be manufactured inexpensively. Therefore, various embodiments of antiglare light diffusing member are known (Patent Document 1).

For example, following antiglare light diffusing members are known.

It is necessary to improve visibility by preventing reflection of external light, scintillation etc. Therefore, following methods have been considered.

To improve light diffusing performance by making irregularity figure of the surface large.

To improve light diffusing performance by increasing the amount of particles to be added.

However, there is such problem in the methods that the sharpness of a transmitted image is lowered.

As methods for improving the visibility etc. without lowering light diffusing performance and the like, following techniques are known.

A technique in which binder matrix resin, spherical particles and amorphous particles are used in combination (Patent Document 2).

A technique in which binder matrix resin and plural particles having different particle sizes are used (Patent Document 3).

A technique including surface irregularity, wherein the cross-sectional area of the concave portion is defined (Patent Document 4).

In addition, in order to improve the visibility without lowering light diffusing performance etc., there is also known such technique that uses scattering in an antiglare light diffusing member and scattering at the surface of antiglare light diffusing member in combination.

The scattering within an antiglare light diffusing member (internal diffusion) occurs by dispersing particles in a binder matrix such as resin of an antiglare light diffusing member, the particles having refraction index different from that of the binder matrix. In order to exert sufficient light diffusing performance, it is necessary to form a certain degree of surface irregularity on the surface of antiglare light diffusing member. However, there are following problems:

Lowering of contrast

Occurrence of dazzling caused by lens effect of the surface irregularity

Lowering of abrasion resistance

The combined use of internal scattering and surface scattering leads to smaller surface irregularity compared with an antiglare light diffusing member using surface scattering alone. Therefore, there are following advantages:

Improvement of contrast

Reduction of dazzling caused by lens effect of the surface irregularity

Improvement of abrasion resistance

For example, as the technique using internal scattering and surface scattering in combination, following techniques are known:

A technique wherein the internal haze (cloudiness) is 1-15%, and the surface haze (cloudiness) is 7-30% (Patent Documents 5, 6).

A technique wherein, while using binder resin and particles having the particle size of 0.5-5 µm, the difference in refraction indices of the resin and the particle is 0.02-0.2 (Patent Document 7).

A technique wherein, while using binder resin and particles having the particle size of 1-5 µm, the difference in refraction indices of the resin and the particle is 0.05-0.15. Further, techniques defining a solvent to be used, surface roughness etc. (Patent Documents 8, 9, 10, 11, 12).

A technique wherein, using binder resin and plural types of particles, the difference in refraction indices of the resin and the particle is 0.03-0.2 (Patent Documents 13, 14).

There are also known following techniques that reduce lowering of contrast, hue variation etc. when a viewing angle is altered. In the technique, the surface haze (cloudiness) is 3 or more. Further, the difference between the haze value in the direction of normal line and the haze value in the direction of ±60° is 4 or less (Patent Documents 15, 16, 17, 18). A technique wherein center line average roughness (Ra) is 0.2 μm or less is also known (Patent Document 19). A technique wherein the center line average roughness (Ra) is 0.02-1 μm, and the ten point average roughness (Rz)/Ra is 30 or less is also known (Patent Document 20, 21).

Since an antiglare light diffusing member is mainly arranged on the front face of a display, abrasion resistance is required. In order to improve the abrasion resistance, it is necessary to improve the hardness of an antiglare light diffusing member. Therefore, there is known such technique as using an ionizing radiation-curing resin binder, silica particles and silicone particles in order to manufacture an antiglare light diffusing member having a high hardness without lowering the display image quality of a display (Patent Document 21).

As described above, there are disclosed antiglare light diffusing members of various constitutions for various purposes.

The performance required for an antiglare light diffusing member differs depending on displays when it is used on the front face of a display. For example, the optimum antiglare light diffusing member differs depending on the resolving power of a display, intended purpose etc. A broad range of antiglare light diffusing members are required according to intended purposes.

As for an antiglare light diffusing member, properties such as surface haze value mainly showing degree of surface diffusion, internal haze value mainly showing internal diffusion, image visibility and degree of brilliance are generally important. In addition, in a case where an antiglare light diffusing member is used in a front surface of a display, properties such as hardness are also important. Further, suitability for coating at the time of manufacturing, cost and curl should be considered. Therefore, many factors are limited. It is difficult to control surface haze, internal haze and the like because many factors are limited.

The invention was accomplished while taking this problem into consideration, and aims to provide an antiglare light diffusing member that can satisfy the external light reflection preventiveness, good contrast, no dazzling and high visibility when it is used for a display.

[Patent Document 1] U.S. Pat. No. 5,387,463
[Patent Document 2] JP-A-2003-260748
[Patent Document 3] JP-A-2004-004777
[Patent Document 4] JP-A-2003-004903
[Patent Document 5] Japanese Patent No. 3507719
[Patent Document 6] U.S. Pat. No. 6,343,865
[Patent Document 7] JP-A-11-326608
[Patent Document 8] Japanese Patent No. 3515426
[Patent Document 9] U.S. Pat. No. 6,696,140
[Patent Document 10] U.S. Pat. No. 7,033,638
[Patent Document 11] US Patent Published Application No. 2002-0150722
[Patent Document 12] US Patent Published Application No. 2004-0150874
[Patent Document 13] Japanese Patent No. 3515401
[Patent Document 14] U.S. Pat. No. 6,217,176
[Patent Document 15] JP-A-11-160505
[Patent Document 16] U.S. Pat. No. 6,111,699
[Patent Document 17] U.S. Pat. No. 6,327,088
[Patent Document 18] U.S. Pat. No. 6,480,249
[Patent Document 19] JP-A-2003-149413
[Patent Document 20] JP-A-2004-125958
[Patent Document 21] JP-A-2004-082613
[Patent Document 22] US Patent Published Application No. 2004-0071986

SUMMARY OF THE INVENTION

In accordance with one embodiment, an antiglare light diffusing member is provided, comprising: a transparent base material; and an antiglare light diffusing layer including a binder matrix and a particle; wherein, as for the layer, arithmetic average roughness Ra1 (λc: 0.008 mm) on the basis of JIS-B0601-1994 is less than 0.008 μm, Ra2 (λc: 0.8 mm) on the basis of JIS-B0601-1994 is 0.1-0.5 μm and internal haze is 1-7%.

BRIEF DESCRIPTION OF DRAWINGS

FIGS. 4 (a) and (b) are cross-sectional views showing a transmission type liquid crystal display with the use of an antiglare light diffusing member of an embodiment of the present invention.

[Description of Reference Numerals]

| | |
|---|---|
| 1 | ··· antiglare light diffusing member |
| 11 | ··· transparent base material |
| 12 | ··· antiglare light diffusing layer |
| 120 | ··· binder matrix |
| 12A | ··· particle A |
| 12B | ··· particle B |
| 12C | ··· particle C |
| $h_b$ | ··· (average) particle diameter of particle B |
| $h_c$ | ··· (average) particle diameter of particle C |
| H | ··· average film thickness of antiglare light diffusing layer |
| 13 | ··· reflection preventing layer |
| 2 | ··· polarization plate |
| 21 | ··· transparent base material |
| 22 | ··· transparent base material |
| 23 | ··· polarization layer |
| 3 | ··· liquid crystal cell |
| 4 | ··· polarization plate |
| 41 | ··· transparent base material |
| 42 | ··· transparent base material |
| 43 | ··· polarization layer |
| 5 | ··· backlight unit |
| 7 | ··· polarization plate unit |

DESCRIPTION OF THE PREFERRED EMBODIMENTS

Figure 1:
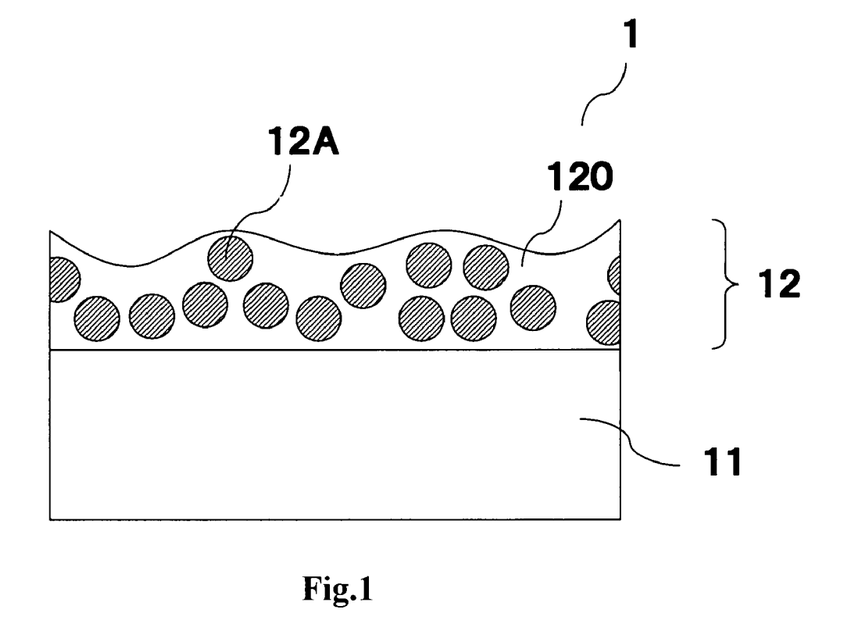
FIG. 1 is a cross-sectional view showing an antiglare light diffusing member of an embodiment of the present invention.

An antiglare light diffusing member of the present invention is described below. FIG. 1 is a cross-sectional view showing an antiglare light diffusing member of an embodiment of the present invention. An antiglare light diffusing member (1) comprises an antiglare light diffusing layer (12) on a transparent base material (11). An antiglare light diffusing layer (12) includes a particle A (12A) in a binder matrix (120). And as for an antiglare light diffusing member (1) there are two kinds of arithmetic average roughness (Ra1 and Ra2) based of JIS-B0601-1994, arithmetic average roughness Ra1 in a case where cutoff wavelength λc is 0.008 mm is less than 0.008 μm, and arithmetic average roughness Ra2 in a case where cutoff wavelength λc is 0.8 mm is 0.1-0.5 cm. The internal haze can be 1-7%.

The λc is a cutoff wavelength when a roughness curve is obtained from a profile curve in the evaluation of the surface roughness. That is, the λc is a parameter that determines a wavelength range of surface irregularity components eliminated from the profile curve. Various types of surface profile parameters such as Ra varies depending on the λc. A smaller λc gives a roughness curve that reflects more components with a shorter wavelength. Accordingly, a smaller λc gives arithmetic average roughness Ra that reflects finer irregularity components. On the other hand, a bigger λc gives arithmetic average roughness Ra that reflects bigger irregularity components.

An antiglare light diffusing member having the external light reflection preventiveness and good contrast can be obtained by controlling the following factors:
1. arithmetic average roughness (Ra1) (cutoff wave length λc:0.008 mm) reflecting finer irregularity components;
2. arithmetic average roughness (Ra2) (cutoff wave length λc:0.8 mm) reflecting bigger irregularity components; and
3. internal haze.

It has been found that when an antiglare light diffusing member has fine surface irregularity represented as Ra1, the member is whitened and contrast is lowered if it is equipped with a display. Then, arithmetic average roughness (Ra1) (cutoff wave length λc:0.008 mm) reflecting finer irregularity components is set to be less than 0.008 μm and arithmetic average roughness (Ra2) (cutoff wave length λc:0.8 mm) reflecting bigger irregularity components is set to be 0.1-0.5 μm. Therefore, fine irregularity of a surface of an antiglare light diffusing layer is eliminated as much as possible and bigger irregularity is formed at a surface of an antiglare light diffusing layer. Therefore, an antiglare light diffusing member having the external light reflection preventiveness and good contrast can be obtained. However, as for an antiglare light diffusing member having an antiglare light diffusing layer of which surface has bigger irregularity represented as Ra2 (0.1-0.5 μm), dazzling due to interference occurs if inside of an antiglare light diffusing layer does not have internal haze. Then, by setting internal haze to be 1-7%, an antiglare light diffusing layer with good visibility which dazzling is suppressed can be obtained.

In some embodiments of the present invention, Ra1 reflecting finer surface irregularity is set to be less than 0.008 μm, that is, Ra1 is lowered as much as possible and Ra2 reflecting bigger surface irregularity is set to be 0.1-0.5 μm. Therefore an antiglare light diffusing member having the external light reflection preventiveness and good contrast can be obtained. By setting internal haze of inside of an antiglare light diffusing layer to be 1-7%, an antiglare light diffusing layer with good visibility which dazzling is suppressed can be obtained. As for an antiglare light diffusing layer, an antiglare light diffusing layer has only bigger irregularity compared with a conventional antiglare light diffusing layer. That is, Ra1 is less than 0.008 μm and Ra2 is 0.1-0.5 μm. Accordingly, good contrast is achieved, but dazzling of a display surface due to interference caused by the big irregularity easily occurs. Therefore internal haze is set to be 1-7%. As for a surface of an antiglare light diffusing layer, Ra1 is set to be less than 0.008 μm and Ra2 is set to be 0.1-0.5 μm. Finer irregularity represented as Ra1 is lowered as much as possible. By an antiglare light diffusing layer having this unique surface profile, an antiglare light diffusing member having no whitened color due to surface irregularity, good contrast, the external light reflection preventiveness and texture like a clear film without surface irregularity.

If Ra1 is set to be more than or equal to 0.008 μm, contrast becomes worse. If Ra1 is less than 0.008 μm and Ra2 is less than 0.1 μm, the external light reflection preventiveness becomes worse. If Ra2 is more than 0.5 μm, contrast becomes worse like the case where Ra1 is more than or equal to 0.008 μm. In addition, if internal haze is less than 1%, dazzling can not be suppressed. In addition, if internal haze is more than 7%, light diffusion at inside of an antiglare light diffusing layer increases and contrast becomes worse.

In an antiglare light diffusing layer of an embodiment of the present invention, to set internal haze of an antiglare light diffusing layer to be 1-7%, a particle of which refractive index is different from a refractive index of a binder matrix must be included in a binder matrix. In this case, it is difficult to set all parameters (Ra1, Ra2 and internal haze) to be within desired ranges. Therefore, the use of plural kinds of particles included in a binder matrix is preferable. In addition, the plural kinds of particles should have different refractive indexes or different particle diameters. In addition, the plural kinds of particles had better have both different refractive indexes and different particle diameters.

Figure 2:
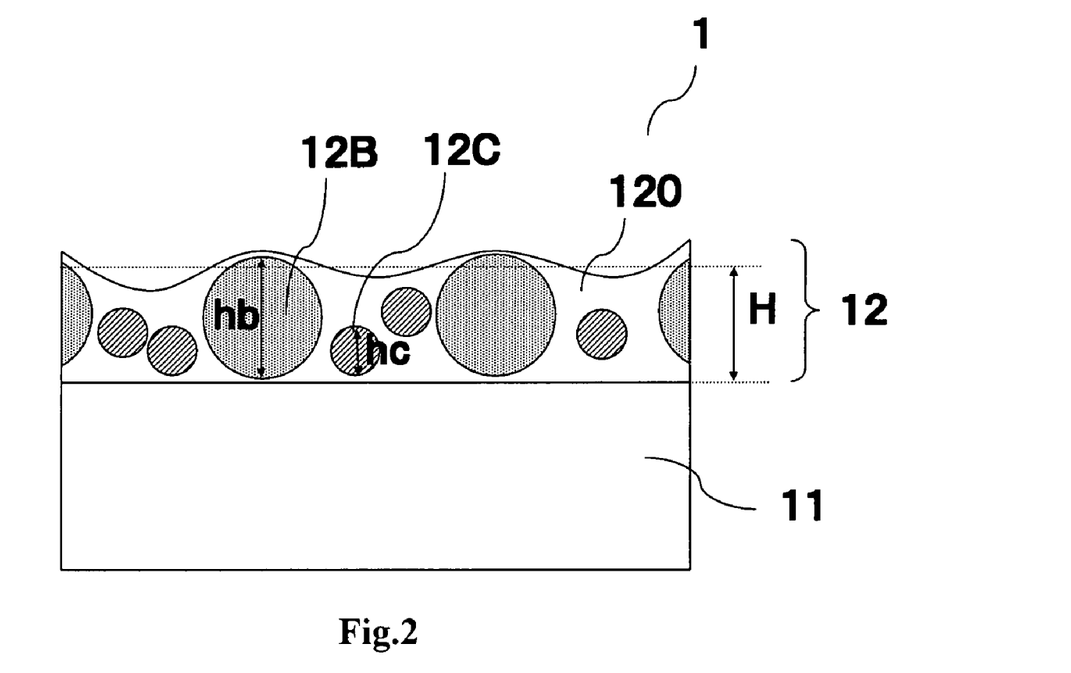
FIG. 2 is a cross-sectional view showing another embodiment of an antiglare light diffusing member of the present invention.

FIG. 2 is a cross-sectional view showing another embodiment of an antiglare light diffusing member of the present invention. In FIG. 2, as for an antiglare light diffusing member, an antiglare light diffusing layer includes a binder matrix and two kinds of particles (particle B (12B) and particle C (12C)). In this case, difference between a refractive index of a particle B (12B) and a refractive index of a binder matrix is less than or equal to 0.02 and an average particle diameter ($h_b$) of a particle B (12B) is bigger than an average film thickness (H) of the antiglare light diffusing layer. In addition, difference between a refractive index of a particle C (12C) and a refractive index of a binder matrix is 0.03-0.20 and an average particle diameter ($h_c$) of a particle C is smaller than 0.9 times of an average film thickness (H) of the antiglare light diffusing layer.

In this case, since an average particle diameter of a particle B is bigger than an average film thickness of the antiglare light diffusing layer, a particle B contributes to forming irregularity in a surface of the antiglare light diffusing layer. In addition, since a refractive index of a particle B is near a refractive index of a binder matrix, a particle B hardly contributes to internal diffusion of incident light into inside of the antiglare light diffusing layer. On the other hand, since there is difference between a refractive index of a particle C and a refractive index of a binder matrix, a particle C can contribute to internal diffusion of inside of the antiglare light diffusing layer by incident light into the antiglare light diffusing layer. Since an average particle diameter of a particle B is smaller than an average film thickness of the antiglare light diffusing layer, a particle B does not contribute to forming irregularity in a surface of the antiglare light diffusing layer.

That is, since the present invention is mentioned above, a particle B can have a function of mainly controlling arithmetic average roughness Ra1 and Ra2 reflecting surface roughness of the antiglare light diffusing layer and a particle C can have a function of controlling internal haze reflecting internal haze of the antiglare light diffusing layer. In addition, by using a particle B and a particle C, to set Ra1, Ra2 and internal haze to be within desired ranges becomes easy. By forming irregularity of a surface of the antiglare light diffusing layer by only a particle B, Ra1 can be less than 0.008 μm and Ra2 can be 0.1-0.5 μm. That is, the antiglare light diffusing layer having only big irregularity can be formed. In addition, by using a particle C of which average particle diameter is smaller than 0.9 times of an average film thickness of the antiglare light diffusing layer and which hardly contributes to forming irregularity of a surface of the antiglare light diffusing layer, only internal haze can be controlled.

An average particle diameter of a particle B is bigger than an average film thickness of the antiglare light diffusing layer. In addition, more preferably, an average particle diameter of a particle B is bigger than an average film thickness of the antiglare light diffusing layer and is smaller than 1.4 times of an average film thickness of the antiglare light diffusing layer. If an average particle diameter of a particle B is smaller than an average film thickness of the antiglare light diffusing layer, it is difficult to set irregularity of a surface of the antiglare light diffusing layer to be a desired value by a particle B. In addition, if an average particle diameter of a particle B is bigger than 1.4 times of an average film thickness of the antiglare light diffusing layer, a particle B formed in a surface of the antiglare light diffusing layer of the antiglare light diffusing member easily drops off. More preferably, an average particle diameter of a particle B is bigger than an average film thickness of the antiglare light diffusing layer and is smaller than 1.2 times of an average film thickness of the antiglare light diffusing layer.

In the present invention, difference between a refractive index of a particle B and a refractive index of a binder matrix is less than or equal to 0.02. In a case where the difference is over 0.02, a particle B tends to contribute to not only surface diffusion but also internal diffusion.

An average particle diameter of a particle C is smaller than 0.9 times of an average film thickness of the antiglare light diffusing layer. If an average particle diameter of a particle C is bigger than 0.9 times of an average film thickness of the antiglare light diffusing layer, a particle C tends to contribute not only to internal diffusion of incident light into a surface of the antiglare light diffusing layer but also to Ra1 and Ra2 of a surface of the antiglare light diffusing layer. The use of a particle C of which average diameter is smaller than 0.8 times of an average film thickness of the antiglare light diffusing layer is more preferable. In addition, the smaller the particle C is, the less the particle C contributes to surface diffusion of incident light into a surface of an antiglare light diffusing layer. Therefore, much smaller particle C is preferable. However, the smaller the particle C is, the higher the cost is. Therefore, it is necessary to select a desired size of a particle C. In addition, in a case where an average particle diameter of a particle C is smaller than a wave length of visible light, a particle C does not scatter incident light. Therefore, an average particle diameter of a particle C should be bigger than or equal to a wave length of visible light.

In some embodiments of the present invention, difference between a refractive index of a particle C and a refractive index of a binder matrix is 0.03-0.20. More preferably, the difference is 0.05-0.08. In a case where the difference is less than 0.03, internal diffusion is insufficient. In addition, in a case where the difference is more than 0.20, an antiglare light diffusing layer tends to be whitened.

In addition, it is desirable that a refractive index of a particle C is higher than a refractive index of a binder matrix by 0.03-0.20. In a case where a refractive index of a particle C is lower than a refractive index of a binder matrix, light emitted from inside of a display tends to reflect totally at an interface between a particle C and a binder matrix. As a result, it is possible that an amount of light at front a surface of a display decreases.

A refractive index of a binder matrix in the present invention means a refractive index of a film after the film is formed by using a binder matrix. The refractive index of a binder matrix and a particle can be measured according to the Becke line-detecting method (immersion method). In addition, in the present invention, an average file thickness of an antiglare light diffusing layer means an average value of a film thickness of an antiglare light diffusing layer having surface irregularity. An average film thickness can be measured by using an electronic micrometer or a full automatic detailed configuration measurement machine.

In addition, in the present invention, a value measured by a light scattering method can be used as an average particle size. The light scattering method will be described below. A sample liquid containing particles is prepared. The sample liquid is measured with a particle size distribution measuring apparatus of a light scattering system. The sample liquid containing particles is prepared so that no aggregation occurs. For the purpose, suitably, the sample liquid is diluted by a diluent in accordance with the type of particles.

In addition, in some embodiments of the present invention, an average film thickness of the antiglare light diffusing layer should be 2 μm-25 μm. When an average film thickness of the antiglare light diffusing layer is smaller than 2 μm, it is possible that whitening occurs. When an average film thickness of the antiglare light diffusing layer is over 25 μm, the cost is too high. More preferably, it is 3 μm-12 μm.

The antiglare light diffusing layer preferably can have a surface hardness of 3H or more in the pencil hardness according to JIS K5400. More preferably it has 4H or more, because an antiglare light diffusing layer provided on a surface of a display can have sufficient abrasion-resistance.

In addition, in an antiglare light diffusing member, to the binder matrix, other functional additives may be added. But, other functional additives must not affect transparency, light diffuseness etc. Examples of the usable functional additive include an antistatic agent, an ultraviolet absorber, an infrared absorber, a refraction index-adjusting agent, an antifouling agent, a water repellent agent, an adhesiveness-improving agent and a curing agent. An antiglare light diffusing layer can have functions such as an antistatic function, an ultraviolet absorbing function, an infrared absorbing function, an antifouling function and a water repellent function besides an antiglare function.

In addition, an antiglare light diffusing member can have a functional layer having a performance such as reflection preventing performance, antistatic performance, antifouling performance, electromagnetic shield performance, infrared absorbing performance, ultraviolet absorbing performance and color correcting performance. Examples of these functional layers include a reflection preventing layer, an antistatic layer, an antifouling layer, an electromagnetic shield layer, an infrared absorbing layer, an ultraviolet absorbing layer, a color correcting layer and the like. In addition, these functional layers may consist of one layer or a plural of layers. One embodiment of the functional layer is that a functional layer consisting of one layer has a plural of functions. For example, a reflection preventing layer having antifouling performance can be adopted. In addition, to improve adhesion property between a transparent base material and an antiglare light diffusing layer or between some kinds of layers, a primer layer, an adhesion layer and the like can be provided between some layers.

Figure 3:
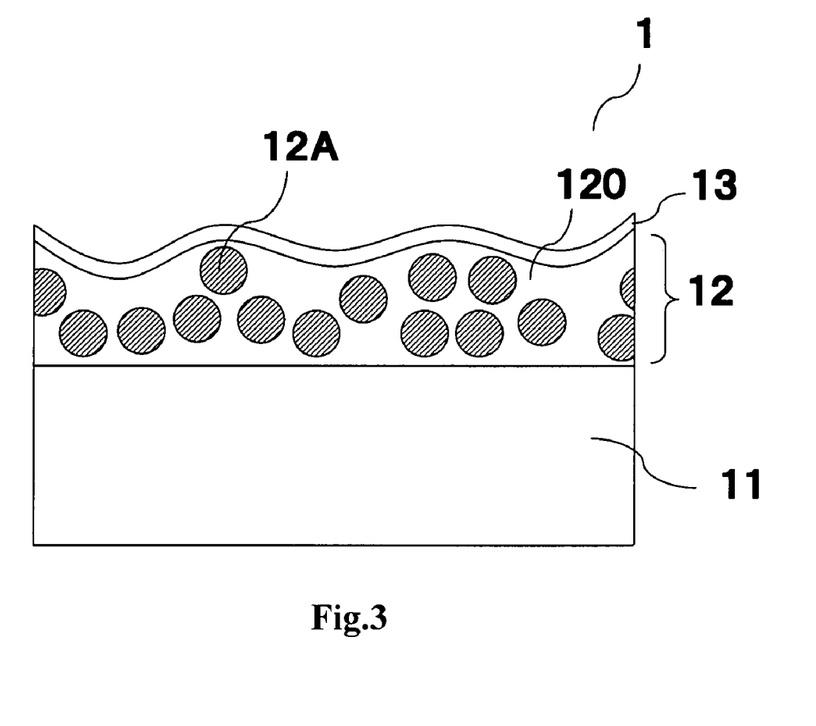
FIG. 3 is a cross-sectional view showing another embodiment of an antiglare light diffusing member of the present invention.

FIG. 3 is a cross-section view showing another embodiment of an antiglare light diffusing member of the present invention. In FIG. 3, as for an antiglare light diffusing member (1), an antiglare light diffusing layer (12) is provided on a transparent base material (11), and further a reflection preventing layer (13) is provided on an antiglare light diffusing layer (12). In addition, a reflection preventing layer (13) may consist of single layer of low refractive index layer or may consist of a plural of layers which a low refractive index layer and a high refractive index layer are repeated.

An antiglare light diffusing member of the present invention can be used for a surface at a observer side of various displays such as a liquid crystal display (LCD), a CRT display, an organic electroluminescence display (ELD), a plasma display (PDP), surface-conduction electron-emitter display (SED), Field Emission Display (FED). The present invention provides an antiglare light diffusing member which is superior in reflection preventing of external light and is superior in contrast in a case where the member is used for a display.

Figure 4:
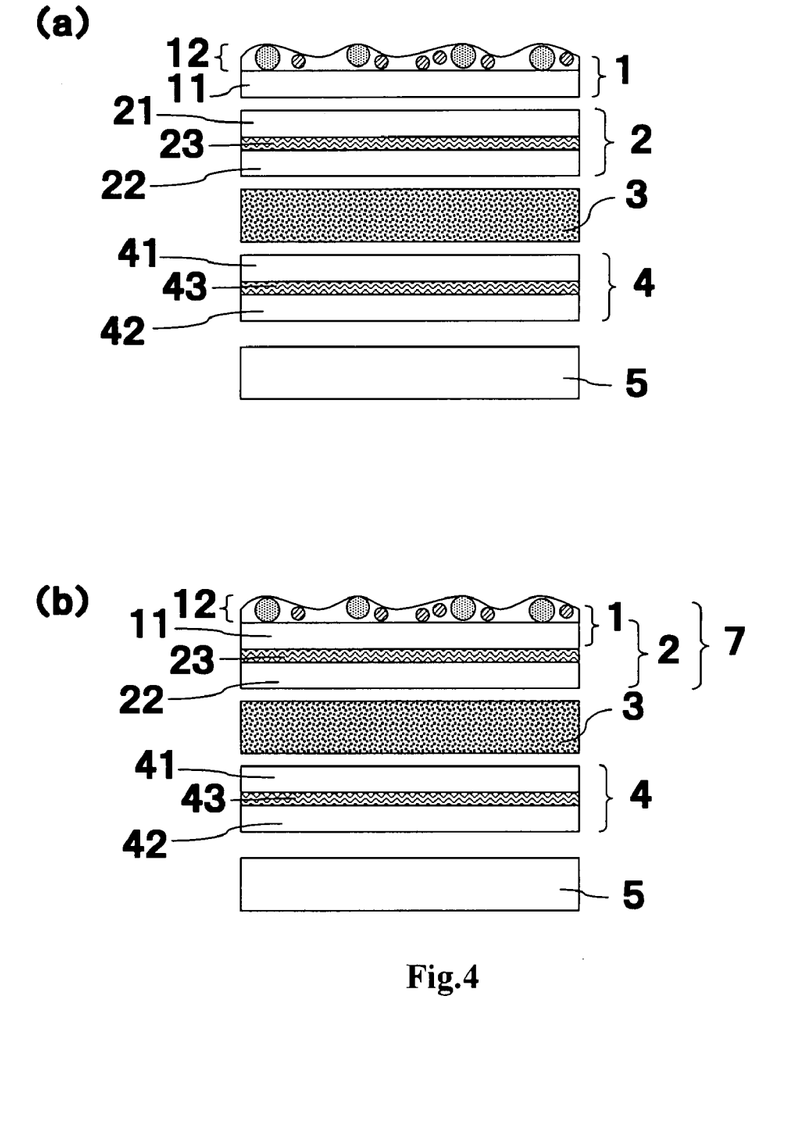

FIG. 4 is a cross-sectional view showing a transmission type liquid crystal display with the use of an antiglare light diffusing member of an embodiment of the present invention. A transmission type liquid crystal display shown in FIG. 4(a) has a backlight unit (5), a polarization plate (4), a liquid crystal cell (3), a polarization plate (2) and an antiglare light diffusing member (1) in this order. In this embodiment, an antiglare light diffusing member (1) side is an observer side, that is, a front surface of a display.

A backlight unit (5) comprises a light source and a light diffusing plate. As for a liquid crystal cell, an electrode is provided on a transparent base material in one side, an electrode and a color filter are provided on a transparent base material in another side and a liquid crystal is encapsulated between both of the electrodes. As for polarization plates sandwiching a liquid crystal cell (3), polarization layers (23, 43) are between transparent base materials (21, 22, 41 and 42).

A transmission type liquid crystal display shown in FIG. 4(b) has a backlight unit (5), a polarization plate (4), a liquid crystal cell (3) and a polarization plate unit (7) which a polarization plate (2) combines with an antiglare light diffusing member (1), in this order.

As for an antiglare light diffusing member used for a liquid crystal display, as shown in FIG. 4(b), a polarization layer (23) can be provided on a surface of a transparent base material (11) opposite to a surface where an antiglare light diffusing layer (12) is formed, and the transparent base material (11) can be used as a polarization plate.

Next, a manufacturing method of an antiglare layer of the present invention is described below.

As the base material for use in the antiglare light diffusing member of the invention, glass, a plastic film etc. can be used. It suffices that the plastic film has a proper degree of transparency and mechanical strength. For example, such films as polyethylene terephthalate (PET), triacetylcellulose (TAC), diacetylcellulose, acetylcellulose butyrate, polyethylene naphthalate (PEN), cycloolefine polymer, polyimide, polyether sulfone (PES), polymethyl methacrylate (PMMA) and polycarbonate (PC) can be used.

When the antiglare light diffusing member is used on the front face of a liquid crystal display etc., triacetylcellulose (TAC) is used preferably because it does not show optical anisotropy.

Further, a polarizing plate may be used as the base material. There is no particular limitation on a polarizing plate to be used. For example, such polarizing plate can be used that has a stretched polyvinyl alcohol (PVA) added with iodine as a polarizing layer between a pair of triacetylcellulose (TAC) films which are supporting bodies of a polarizing layer. A polarizing plate composed of a TAC film and a stretched PVA added with iodine has a high polarization degree and can be used suitably for a liquid crystal display etc. In this case, an antiglare light diffusing layer can be provided on one of triacetylcellulose (TAC) films.

In addition, as for a transparent base material for the present invention, from the viewpoint of optical property, mechanical strength, handleability etc., the thickness of the base material is preferably 10-500 μm.

To the base material, an additive may be added. Examples of the additive include an ultraviolet absorber, infrared absorber, antistatic agent, refraction index-adjusting agent and reinforcing agent.

For the binder matrix for use in the antiglare light diffusing layer, following properties are required.

When a film is formed using the binder matrix, the film has proper degree of transparency and mechanical strength.
Added particles are dispersed in the binder matrix.

For example, ionizing radiation-curable resin such as ultraviolet ray-curable resin and electron beam-curable resin, heat-curable resin, thermoplastic resin, and an inorganic or organic-inorganic composite matrix obtained by hydrolyzing and dehydration-condensing metal alkoxide can be used.

Examples of the heat-curable resin include heat curable type urethane resin composed of acrylic polyol and isocyanate prepolymer, phenol resin, urea-melamine resin, epoxy resin, unsaturated polyester resin and silicone resin.

Examples of the ionizing radiation-curable resin include polyfunctional acrylate resin such as acrylic or methacrylic ester of polyhydric alcohol, and polyfunctional urethane acrylate resin synthesized from diisocyanate, polyhydric alcohol and hydroxyl ester of acrylic acid or methacrylic acid. In addition to these, polyether resin having an acrylate-based functional group, polyester resin, epoxy resin, alkyd resin, spiroacetal resin, polybutadiene resin, polythiolpolyene resin can be also used.

Among the ionizing radiation-curable resin, when ultraviolet ray-curable resin is used, a photopolymerization initiator is added. Any photopolymerization initiator may be usable, but the use of one suitable for a resin to be used is preferred.

As the photopolymerization initiator (radical polymerization initiator), benzoin and alkyl ethers thereof such as benzoin, benzoinmethylether, benzomethylether, benzoinisopropylether and benzylmethylketal are used. The use amount of the photosensitizing agent can be 0.5-20 wt %, preferably 1-5 wt % relative to the resin.

Examples of the usable thermoplastic resin include cellulose derivatives such as acetylcellulose, nitrocellulose, acetylbutylcellulose, ethylcellulose and methylcellulose, vinyl-based resins such as vinyl acetate and copolymer thereof, vinyl chloride and copolymer thereof and vinylidene chloride and copolymer thereof, acetal resin such as polyvinyl formal and polyvinyl butyral, acrylic resin such as acrylate resin and copolymer thereof and methacrylate resin and copolymer thereof, polystyrene resin, polyamide resin, linear polyester resin and polycarbonate resin.

Examples of the usable inorganic or organic-inorganic composite matrix include materials using silicon oxide-based matrix employing a silicon alcoxide-based material as a starting material. For example, tetraethoxysilane can be used.

When the base material is made of a plastic film, in order to supply mechanical strength, a binder matrix having a high hardness is preferably used. Specifically, resin having a high hardness, and inorganic or organic-inorganic composite matrix obtained by hydrolyzing and dehydration-condensing metal alkoxide can be used. In particular, when using a plastic film having a thickness of 100 μm or less, the use of a binder matrix having a high hardness is preferred.

Especially, the use of an ionizing radiation-curable resin such as an ultraviolet ray-curable resin and an electron beam-curable resin for a binder matrix of an antiglare light diffusing member of the present invention is preferable. The use of ionizing radiation-curable resin makes it possible to manufacture an antiglare light diffusing layer having a certain degree of flexibility, no crack and high hardness which surface hardness is, for example, beyond 3H.

In addition, in an antiglare light diffusing member of the present invention, difference between a refractive index of a binder matrix and a refractive index of a base material is preferably 0.01-0.12. By setting the difference to be 0.01-0.12, haze generated due to the difference can be suppressed. Especially, in a case where an antiglare light diffusing member consisting of only a base material and an antiglare light diffusing layer, from the view point of generation of haze due to the difference, a difference between a refractive index of a binder matrix and a refractive index of a transparent base material is preferably 0.01-0.08. In a case where reflection preventing layer is provided on an antiglare light diffusing layer, a difference between a refractive index of a binder matrix and a refractive index of a transparent base material is preferably 0.03-0.12. A refractive index of a triacetylcellulose (TAC) film is about 1.49. A refractive index of a polyethylene terephthalate (PET) film is about 1.68. Therefore there are a lot of material of which refractive index is 1.5-1.6. Therefore, a refractive index of a binder matrix is preferably about 1.46-1.65.

As mentioned above, a refractive index of a binder matrix for the present invention means a refractive index of a film after the film is formed by using a binder matrix. That is, in a case where curable resin is used, a refractive index of a binder matrix means a refractive index of a film after the film is formed by curing the curable resin. A refractive index of a binder matrix is a measured value by using a binder matrix without a particle for measurement.

Particles used for an antiglare light diffusing layer of some embodiments of the present invention are selected from silica particle (refractive index 1.46), acryl particle (refractive index 1.49), acryl-styrene particle (refractive index 1.49-1.59), talc (refractive index 1.54), various aluminosilicate (refractive index 1.50-1.60), kaolin clay (refractive index 1.53), MgAl hydrotalcite (refractive index 1.50), styrene particle (refractive index 1.59), acryl styrene particle (refractive index 1.58), polycarbonate particle (refractive index 1.58), melamine particle (refractive index 1.66) and the like. However, usable particles are not limited to the above mentioned particles.

The particles preferably have a spherical shape. In addition, the spherical particle includes a perfect spherical particle and ellipse-sphere, and further, particles formed continuously by spherical surfaces.

An antiglare light diffusing layer can be obtained by the following processes: a coating liquid including a starting material of a binder matrix and the particle is applied to a base material; and this coating liquid on a base material is dried or cured.

The coating liquid may contain a solvent according to need.

The solvent must be able to disperse the starting material of the binder matrix and the particle. Further, the solvent is required to be provided with coating aptitude. For example, toluene, cyclohexanone, acetone, ketone, ethylcellosolve, ethylacetate, butylacetate, methyl isobutyl ketone, isopropanol methyl ethyl ketone, cyclohexanone, tetrahydrofuran, nitromethane, 1,4-dioxan, dioxolane, N-methylpyrrolidone, ethyl acetate, methyl acetate, dichloromethane, trichloromethane, trichloroethylene, ethylene chloride, trichloroethane, tetra chloroethane, N,N-dimethylformamide and chloroform can be used. In addition a combined solvent thereof can be used.

The amount of the solvent is not particularly limited.

In addition, a solvent which can dissolve a base material can be used. By the use of such a solvent, adhering strength between a base material and an antiglare light diffusing layer can be increased. The use of a combined solvent including a solvent which can dissolve a base material and a solvent which can not dissolve a base material is more preferable.

A coating method using a roll coater, a reverse roll coater, a gravure coater, a knife coater, a bar coater or a slot die coater can be used.

The solid content concentration of the coating liquid differs depending on a coating method. The solid content concentration may be around 30-70 wt % in weight ratio.

A case where a curable resin is used as a binder matrix and an antiglare layer is formed will be described. The above-described coating liquid is coated on the base material. Then, by applying external energy such as ultraviolet rays, electron beams or heat to the coated layer, the coated layer is cured. Thus, the antiglare light diffusing layer is formed. In the case of ultraviolet curing, such light source as a high-pressure mercury lamp, a low-pressure mercury lamp, an ultrahigh-pressure mercury lamp, a metal halide lamp, a carbon arc lamp and a xenon arc lamp can be utilized.

In the case of electron beam curing, electron beams emitted from various types of electron beam accelerators such as of Cockroft-Walton type, Vandegraph type, resonance transformation type, insulated core transformer type, linear type, Dynamitron type and radio-frequency type, can be utilized. The electron beam has an energy of preferably 50-1000 KeV, more preferably 100-300 KeV.

Before and after the curing process, a drying process may be provided. The curing and drying may be effected simultaneously.

Examples of drying means include heating, air blowing and hot air blowing.

A method for forming the antiglare light diffusing layer using a thermoplastic binder matrix will be described below. The coating liquid is coated on the base material. Then, the coated layer is dried. Thus the antiglare light diffusing layer is formed. Examples of drying means include heating, air blowing and hot air blowing.

A method for forming the antiglare light diffusing layer using an inorganic or organic-inorganic composite matrix will be described below. The coating liquid is coated on the base material. Then, by applying external energy such as ultraviolet rays, electron beams or heat, the coated layer is cured. Thus, the antiglare light diffusing layer is formed.

Before and after the curing process, a drying process may be provided. The curing and drying may be effected simultaneously.

Examples of drying means include heating, air blowing and hot air blowing.

When a polarizing plate having a polarizing layer between a pair of supports for the polarizing layer is used as a base material, a method for manufacturing the antiglare light diffusing member will be described below.

First, on a first support for the polarizing layer, the antiglare light diffusing layer is provided by a method similar to the method described above.

In addition, in the present invention, irregularity of a surface of the antiglare light diffusing layer can be formed by embossing. In addition, in this case, to generate internal haze, a particle of which refractive index is different from a refractive index of a binder matrix must be also included.

Next, on the side of the first support for the polarizing layer facing to the side provided with the antiglare light diffusing layer, a polarizing layer is provided. When the polarizing plate is composed of a TAC film and stretched PVA film added with iodine, the stretched PVA film added with iodine is laminated while being stretched on the support for the polarizing layer to provide the polarizing layer.

Next, a second support for the polarizing layer is provided on the polarizing layer.

Another method for manufacturing the antiglare light diffusing member will be described below.

First, a polarizing plate having a polarizing layer between a pair of supports for the polarizing layer is prepared. Then, the antiglare light diffusing layer is provided on one of the supports for the polarizing layer.

As mentioned above, an antiglare light diffusing member of the present invention can have a reflection preventing layer, a water repellent layer, an antifouling layer and the like. In addition, to improve adhesion property between a transparent base material and an antiglare light diffusing layer or between some kinds of layers, a primer layer, an adhesion layer and the like can be provided between some layers.

As mentioned above, in an antiglare light diffusing member of the present invention, to the binder matrix, other functional additives may be added. But, other functional additives must not affect transparency, light diffuseness etc. Examples of the usable functional additive include an antistatic agent, an ultraviolet absorber, an infrared absorber, a refraction index-adjusting agent, an antifouling agent, a water repellent agent, an adhesiveness-improving agent and a curing agent. An antiglare light diffusing layer can have functions such as an antistatic function, an ultraviolet absorbing function, an infrared absorbing function, an antifouling function and a water repellent function besides an antiglare function.

In addition, an antiglare light diffusing member can include a functional layer having reflection preventing performance, antistatic performance, antifouling performance, electromagnetic shield performance, infrared absorbing performance, ultraviolet absorbing performance, color correction performance or the like. And, a primer layer, an adhesion layer and the like can be provided between some layers to improve adhesion property between some kinds of layers.

Hereinafter, Examples and Comparative Examples are shown.

A measuring method of the refraction index of a binder matrix used in Examples and Comparative Examples is described below. A coating liquid similar to that described above was prepared. But, no particle was contained in the coating liquid. The coating liquid was coated, dried and cured according to a method similar to that described above. The refraction index of thus obtained layer was measured. A digital refractometer RX2000 (manufactured by ATAGO CO., LTD.) was used, and the refraction index was measured according to the light refraction critical angle-detecting system.

The refraction index of the particle was measured according to the Becke line-detecting method (immersion method).

Average particle sizes were measured using a particle size distribution measuring apparatus of a light diffusing system (SALD-7000, manufactured by Shimadzu Corporation).

EXAMPLE 1

A triacetylcellulose film (TD-80U, manufactured by Fuji Photo Film Co., LTD.; refraction index 1.49, film thickness 80 μm) was used as a transparent base material. On the transparent base material, an antiglare light diffusing coating liquid having the composition shown in Table 1 and Table 2 was coated with a slot die coater. Then, a solvent included in the coating liquid was evaporated. Then, the antiglare light diffusing layer was cured through ultraviolet irradiation of 400 mJ using a high-pressure mercury lamp under an atmosphere of 0.03% or less of oxygen concentration. The dried antiglare light diffusing layer had a thickness of 5.0 μm. Thus, a sample was prepared.

TABLE 1

| Binder matrix | pentaerythritol acrylate (PE3, manufactured by KYOEISHA CHEMICAL Co., LTD.) | Refractive index 1.52 | |
|---|---|---|---|
| Particle B | acrylic-styrene bead (XX96P, manufactured by SEKISUI PLASTICS CO., LTD.) | Refractive index 1.53 | Particle diameter 5.8 μm |
| Particle C | styrene bead (SX-350H, manufactured by Soken Chemical & Engineering Co., Ltd.) | Refractive index 1.59 | Particle diameter 3.5 μm |
| photo-polymerization initiator | Irgacure 184 (manufactured by Ciba Specialty Chemicals) | | |
| solvent | toluene | | |

TABLE 2

| | | | | |
|---|---|---|---|---|
| Example 1 | Binder matrix | 100 | part by weight | Average film thickness of an antiglare light diffusing layer 5.0 μm |
| | Particle B | 2 | part by weight | |
| | Particle C | 2 | part by weight | |
| | photopolymerization initiator | 5 | part by weight | |
| | Solvent | 102 | part by weight | |
| Example 2 | Binder matrix | 100 | part by weight | Average film thickness of an antiglare light diffusing layer 5.0 μm |
| | Particle B | 1.5 | part by weight | |
| | Particle C | 3 | part by weight | |
| | photopolymerization initiator | 5 | part by weight | |
| | Solvent | 101.5 | part by weight | |
| Comparative Example 1 | Binder matrix | 100 | part by weight | Average film thickness of an antiglare light diffusing layer 4.0 μm |
| | Particle B | 4 | part by weight | |
| | Particle C | 4 | part by weight | |
| | photopolymerization initiator | 5 | part by weight | |
| | Solvent | 104 | part by weight | |
| Comparative Example 2 | Binder matrix | 100 | part by weight | Average film thickness of an antiglare light diffusing layer 5.0 μm |
| | Particle B | 1 | part by weight | |
| | Particle C | 1 | part by weight | |
| | photopolymerization initiator | 5 | part by weight | |
| | Solvent | 101 | part by weight | |
| Comparative Example 3 | Binder matrix | 100 | part by weight | Average film thickness of an antiglare light diffusing layer 5.0 μm |
| | Particle B | 5 | part by weight | |
| | Particle C | 5 | part by weight | |
| | photopolymerization initiator | 5 | part by weight | |
| | Solvent | 105 | part by weight | |
| Comparative Example 4 | Binder matrix | 100 | part by weight | Average film thickness of an antiglare light diffusing layer 4.0 μm |
| | Particle B | 2 | part by weight | |
| | Particle C | 1 | part by weight | |
| | photopolymerization initiator | 5 | part by weight | |
| | Solvent | 102 | part by weight | |

TABLE 2-continued

| Comparative Example 5 | Binder matrix | 100 part by weight | Average film thickness of an antiglare light diffusing layer 6.0 μm |
|---|---|---|---|

EXAMPLE 2

An antiglare layer was prepared same as example 1 with the use of an antiglare light diffusing coating liquid having the composition shown in Table 1 and Table 2. The weight ratio of composition of example 2 was different from that of example 1. The dried and cured antiglare light diffusing layer had a thickness of 5.0 μm. Thus, a sample was prepared.

COMPARATIVE EXAMPLE 1

An antiglare layer was prepared same as example 1 with the use of an antiglare light diffusing coating liquid having the composition shown in Table 1 and Table 2. The weight ratio of composition of comparative example 1 was different from that of example 1. The dried and cured antiglare light diffusing layer had a thickness of 4.0 μm. Thus, a sample was prepared.

COMPARATIVE EXAMPLE 2

An antiglare layer was prepared same as example 1 with the use of an antiglare light diffusing coating liquid having the composition shown in Table 1 and Table 2. The weight ratio of composition of comparative example 3 was different from that of example 1. The dried and cured antiglare light diffusing layer had a thickness of 5.0 μm. Thus, a sample was prepared.

COMPARATIVE EXAMPLE 3

An antiglare layer was prepared same as example 1 with the use of an antiglare light diffusing coating liquid having the composition shown in Table 1 and Table 2. The weight ratio of composition of comparative example 3 was different from that of example 1. The dried and cured antiglare light diffusing layer had a thickness of 5.0 μm. Thus, a sample was prepared.

COMPARATIVE EXAMPLE 4

An antiglare layer was prepared same as example 1 with the use of an antiglare light diffusing coating liquid having the composition shown in Table 1 and Table 2. The weight ratio of composition of comparative example 4 was different from that of example 1. The dried and cured antiglare light diffusing layer had a thickness of 4.0 μm. Thus, a sample was prepared.

COMPARATIVE EXAMPLE 5

An antiglare layer was prepared same as example 1 with the use of an antiglare light diffusing coating liquid having the composition shown in Table 1 and Table 2. The weight ratio of composition of comparative example 5 was different from that of example 1. The dried and cured antiglare light diffusing layer had a thickness of 6.0 μm. Thus, a sample was prepared.

EVALUATION

As for each sample obtained in examples 1 and 2 and comparative examples 1, 2, 3, 4 and 5, measured results or evaluation results of arithmetic average roughness Ra1 ($\lambda c$: 0.008 mm) and Ra2 ($\lambda c$: 0.8 mm), internal haze, contrast, reflection property of external light (antiglare property), dazzling and pencil hardness are shown in Table 3. In addition, measuring method of arithmetic average roughness Ra1 and Ra2, measuring method of internal haze, evaluation method of contrast, evaluation method of reflection property of external light (antiglare property), evaluation method of dazzling and measuring method of pencil hardness are described below.

TABLE 3

|  | arithmetic average roughness | | Internal haze (%) | contrast | Reflection Property of External Light (antiglare property) | dazzling | pencil hardness |
|---|---|---|---|---|---|---|---|
|  | Ra1 (μm) | Ra2 (μm) |  |  |  |  |  |
| Example 1 | 0.005 | 0.22 | 5 | ○ | ○ | ○ | 3H |
| Example 2 | 0.004 | 0.29 | 6 | ○ | ○ | ○ | 3H |
| Comparative Example 1 | 0.011 | 0.34 | 6 | x | ○ | ○ | 3H |
| Comparative Example 2 | 0.001 | 0.07 | 2 | ○ | x | Δ | 3H |
| Comparative Example 3 | 0.007 | 0.55 | 3 | x | ○ | Δ | 3H |
| Comparative Example 4 | 0.005 | 0.35 | 0.8 | ○ | ○ | x | 3H |
| Comparative Example 5 | 0.007 | 0.30 | 9 | x | ○ | ○ | 3H |

Measuring Method of Arithmetic Average Roughness Ra1 and Ra2

Ra1 (λc: 0.008 mm) and Ra2 (λc: 0.8 mm) were measured using a high accuracy micro figure measuring instrument (SURF CORDER ET4000A, manufactured by Kosaka Laboratory Ltd.) on the basis of JIS-B0601-1994 (evaluation length=0.8 mm, scanning rate=0.005 mm/sec).

Measuring Method of Internal Haze

The haze was measured using a haze meter (NDH2000, NIPPON DENSHOKU) according to JIS K7105. The haze of an antiglare light diffusing member of each sample was determined to be the total haze. And the haze of a sample which a triacetylcellulose sheet was placed on a antiglare light diffusing member through a two-sided adhesive sheet wherein the triacetylcellulose film was on a surface of an antiglare layer of the antiglare light diffusing member was measured, and a haze value which hazes (0.2%) of the two-sided adhesive sheet and the triacetylcellulose film were eliminated from the measured haze was determined to be an internal haze.

Evaluation Method of Contrast

As for each sample, by using a brightness photometer (TOPCOM-BM7), white luminance and black luminance of an antiglare light diffusing member provided on a display surface at a bright room of 200 lux and a dark room were measured. White luminance/black luminance is determined to be contrast. About marks is described below.
○: contrast at a bright room is more than or equal to 200 and contrast at a dark room is more than or equal to 300. (good contrast)
x: contrast at a bright room is not more than or equal to 200, or contrast at a dark room is not more than or equal to 300.

Evaluation Method of Reflection Property of External Light (Antiglare Property)

Respective samples were laminated to respective black plastic plates and, in that state, the reflection of fluorescent light was evaluated visually. The judgment standard is shown below.
○: reflection is indistinctive
x: reflection is recognized Evaluation Method of Dazzling A glass substrate with a black matrix (BM) of 80-200 ppi pattern was placed on a light table incorporating fluorescent light tubes and a glass substrate with an antiglare light diffusing member was placed on the glass substrate with the black matrix. In this state, dazzling of an antiglare light diffusing layer was evaluated by eyes. In this evaluation, the biggest value among resolutions of BM which dazzling was not observed was determined to be the corresponding resolution.

○: the corresponding resolution is bigger than 100 ppi.

Δ: the corresponding resolution is 80-100 ppi.

x: the corresponding resolution is less than 80 ppi.

Measuring Method of Pencil Hardness

As for each sample, the pencil hardness was measured according to JIS K5400.

Examples and Comparative Examples showed the following results. In Example 1 and Example 2 where Ra1 was less than 0.08 μm, Ra2 was 0.1-0.5 μm and internal haze was 1-7%, it was found that the antiglare light diffusing member had good contrast, antiglare property (superior in reflection property of external light) and no dazzling. The antiglare light diffusing member of Example 1 and 2 were not whitened and had texture like a clear film without surface irregularity.

On the other hand, the antiglare light diffusing member of comparative example 1 had bad contrast. The antiglare light diffusing member of comparative example 2 was not superior in reflection property of external light, that is, was not superior in antiglare property. The antiglare light diffusing member of comparative example 3 had bad contrast. The antiglare light diffusing member of comparative example 4 had dazzling. The antiglare light diffusing member of comparative example 5 had bad contrast. All comparative examples had worse performance than the performances of examples.

What is claimed is:

1. An antiglare light diffusing member comprising:
  a transparent base material;
  an antiglare light diffusing layer including a binder matrix and a particle over the transparent base material;
  wherein an arithmetic average roughness Ra1 (λc: 0.008 mm) of the antiglare light diffusing layer on the basis of JIS-B0601-1994 is less than 0.008 μm, Ra2 (λc: 0.8 mm) of the antiglare light diffusing layer on the basis of JIS-B0601-1994 is 0.1-0.5 μm and an internal haze of the antiglare light diffusing layer is 1-7%.
  wherein plural kinds of the particles are included in the binder matrix,
  wherein the plural kinds of the particles are a particle (B) and a particle (C),
  wherein difference between a refractive index of the particle (B) and a refractive index of the binder matrix is less than or equal to 0.02 and an average particle diameter ($h_b$) of the particle (B) is bigger than an average film thickness (H) of the antiglare light diffusing layer,
  and wherein difference between a refractive index of the particle (C) and a refractive index of the binder matrix is 0.03-0.20 and an average particle diameter ($h_c$) of the particle (C) is smaller than 0.9 times of an average film thickness (H) of the antiglare light diffusing layer.

2. The antiglare light diffusing member according to claim 1, wherein a film thickness of the antiglare light diffusing layer is 2-25 μm.

3. The antiglare light diffusing member according to claim 1, wherein the base material is a triacetylcellulose film.

4. The antiglare light diffusing member according to claim 1, wherein the base material is used as a polarization plate.

5. A display comprising:
  the antiglare light diffusing layer according to claim 1 provided on a surface of the display.

6. A liquid crystal display comprising:
  the antiglare light diffusing layer according to claim 1 provided on a surface of the display.

* * * * *